(12) United States Patent
Goto (10) Patent No.: US 10,849,061 B2
(45) Date of Patent: Nov. 24, 2020

(54) COMMUNICATING DEVICE, CONTROL METHOD THEREFOR, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/126,525

(22) Filed: Sep. 10, 2018

(65) Prior Publication Data

US 2019/0082386 A1    Mar. 14, 2019

(30) Foreign Application Priority Data

Sep. 14, 2017  (JP) ................................ 2017-176377

(51) Int. Cl.
| | |
|---|---|
| *H04W 52/02* | (2009.01) |
| *H04L 29/08* | (2006.01) |
| *H04W 8/00* | (2009.01) |
| *H04W 84/12* | (2009.01) |

(52) U.S. Cl.
CPC ......... *H04W 52/0203* (2013.01); *H04L 67/26* (2013.01); *H04L 67/28* (2013.01); *H04W 8/005* (2013.01); *H04W 84/12* (2013.01)

(58) Field of Classification Search
CPC .. H04L 67/28; H04W 48/08; H04W 52/0203; H04B 7/155
See application file for complete search history.

(56) References Cited

U.S. PATENT DOCUMENTS

| | | | |
|---|---|---|---|
| 2015/0081840 A1 | 3/2015 | Patil et al. | |
| 2016/0198006 A1* | 7/2016 | Tsai | H04L 67/16 370/329 |
| 2016/0352842 A1* | 12/2016 | Patil | H04W 48/08 |
| 2019/0098680 A1* | 3/2019 | Park | H04W 76/14 |

* cited by examiner

*Primary Examiner* — Iqbal Zaidi
(74) *Attorney, Agent, or Firm* — Canon U.S.A., Inc. IP Division (57) ABSTRACT

In a case where a communicating device requests a proxy device to execute a notification of service information provided by the communicating device or requests the proxy device to start or termination a search of service information provided by another communicating device, the communicating device performs a notification based on a response to the request to a user.

20 Claims, 6 Drawing Sheets

COMMUNICATING DEVICE, CONTROL METHOD THEREFOR, AND STORAGE MEDIUM

BACKGROUND OF THE INVENTION

Field of the Invention

The present disclosure relates to a device configured to notify information regarding proxy processing.

Description of the Related Art

A NAN (Neighbor Awareness Networking) standard is defined by Wi-Fi Alliance as a power saving standard for searching a device or searching a service provided by a device. US2015/81840 discloses a method for requesting a proxy process for causing a device called a Proxy Server to perform, by proxy, processing for searching or providing a service by another device.

However, according to the technology disclosed in US2015/81840, even when a proxy process such as a service search is requested to the Proxy Server, whether the proxy process has started or not is not notified to a user. Therefore, for example, even when a user instructs to start a proxy process, whether the proxy process has been started in response to the instruction or not is not notified to a user.

In view of the above issue, in a case where a request relating to a proxy process based on a scheme based on a NAN standard is executed or is received, there is a need for a user to be notified of information regarding the proxy process.

SUMMARY OF THE INVENTION

A communicating device according to an aspect of the present disclosure comprises one or more processors; and one or more memories including instructions that, when executed by the processor(s), cause the device to: request a proxy device such that the proxy device starts or terminates a notification of service information provided by the communicating device according to a scheme based on a NAN (Neighbor Awareness Networking) standard; obtain from the proxy device execution information indicating whether the proxy device executes the start or termination of the notification of the service information in response to the request according to the scheme based on the NAN standard; and perform the notification based on the obtained execution information to a user.

A communicating device according to another aspect of the present disclosure comprises one or more processors; and one or more memories including instructions that, when executed by the processor(s), cause the device to: request a proxy device such that the proxy device starts or terminates a search of service information provided by another communicating device according to a scheme based on a NAN (Neighbor Awareness Networking) standard; obtain from the proxy device execution information indicating whether the proxy device executes the start or termination of the search of the service information in response to the request according to the scheme based on the NAN standard; and perform the notification based on the obtained execution information to a user.

Further features of the present invention will become apparent from the following description of exemplary embodiments with reference to the attached drawings.

DESCRIPTION OF THE EMBODIMENTS

Embodiments of the present disclosure will be described below with reference to drawings. Although the following descriptions assume that each of the communicating devices has a communication function for a wireless LAN based on IEEE802.11 standard series, the present disclosure is not limited thereto. Each of the communicating devices which will be described below is assumed to be a Neighbor Awareness Networking (NAN) device which can detect another communicating device a service (instance) provided thereby based on Wi-Fi Alliance NAN. Here, the service (which may also be called a function or an instance) may be a printing service, an information sharing service, an image display service, an image capturing service or the like.

Although the following descriptions use terms supporting a NAN standard, the following discussions can also be applicable to other standards of the same type. In other words, the present disclosure is applicable to a standard different from the NAN standard.

A communicating device based on the NAN standard communicates service information during a period (DW period) called a Discovery Window (DW) which is set periodically. During a DW, a plurality of devices to execute a NAN communicates intensively (or converges) at a predetermined frequency channel (6 ch in Wi-Fi 2.4 GHz). A set of devices which share a DW schedule (DW timing) in synchronization will be called a NAN cluster.

Each of the devices belonging to the NAN cluster operates any one role of a Master, a Non-Master Sync and a Non-Master Non-Sync. A device which operates as a Master is configured to transmit a Synchronization Beacon (Sync Beacon) so that the devices can share a DW in synchronization. A device which operates as a Master is configured to transmit a Discovery Beacon that is a signal for causing a device not belonging to the NAN cluster to recognize the NAN cluster. The Discovery Beacon may be transmitted every 100 TUs (Time Units where 1 TU is 1024 µsecond), for example, and may be transmitted outside of a DW period. In each of the NAN clusters, at least one device operates as a Master.

A device which operates as a Non-Master Sync is configured to transmit a Sync Beacon but does not transmit a Discovery Beacon. A device which operates as a Non-Master Non-Sync transmits neither Sync Beacon nor Discovery Beacon.

A device participating in a NAN cluster synchronizes with DW periods at predetermined intervals based on information included in the Sync Beacon and communicates service information in each of the DW periods.

More specifically, each of the devices is configured to search a service provided by another communicating device and mutually communicates a Subscribe message that is a signal for detection and a Publish message that is a signal for notifying a service provided by the device itself during a DW period. Each of the devices further can exchange a Follow-up message for exchanging additional information regarding services during a DW period. It should be noted that Publish, Subscribe, and Follow-up are all messages based on the NAN standard. These messages are collectively called a Service Discovery Frame (SDF). Each of the devices may exchange the SDF according to a scheme based on the NAN standard so that a service can be advertised or be detected.

A NAN device has a DOZE state in which the device does not transmit and receive a wireless signal outside a DW period for saving power consumption. The NAN device also has a DOZE state in which the device does not transmit and receive a wireless signal even in a DW period for saving power consumption. The NAN device in the DOZE state during a DW period cannot transmit and receive a Subscribe message and a Publish message. This may increase a period for such a NAN device to detect another NAN device and a service provided by the other NAN device or a period for another NAN device to detect a service provided by the NAN device.

Accordingly, a case will be considered in which a NAN device requests another NAN device a search or a notification of a service such as Subscribe and Publish. Here, a NAN device which executes by proxy a search or a notification for a service of another NAN device is called a Proxy Server (proxy device). A NAN device which requests a proxy for a search or a notification of a service to another NAN device is called a Proxy Client.

A Proxy Server is configured to transmit by proxy service information provided by a Proxy Client when a request for proxy transmission of the service information is received from the Proxy Client. The Proxy Server executes by proxy a search for the service information to be searched by the Proxy Client if the request for proxy search for the service information is received from the Proxy Client. In this case, the Proxy Server notifies the service information search result to the Proxy Client. This is called a proxy search.

The Proxy Client may request only one of the requests to the Proxy Server or may request both of them to the Proxy Server. If both of them are requested, the request for proxy transmission of service information and the request for proxy search for service information can be performed by using individual request signals or by one request signal collectively.

In a case where a proxy transmission and/or proxy search relating to a plurality of services are to be requested, a separate request signal may be used for each of the plurality of services, or one request signal may be used therefor collectively.

The Proxy Server may execute service search and notification as a proxy for the Proxy Client so that the Proxy Client may not execute the service search and notification. Thus, the Proxy Client can have the DOZE state over a longer period so that power consumption relating to the NAN communication can be reduced. The NAN device which searches a service provided by the Proxy Client has advantages. That is, when the Proxy Client has a DOZE state, the Proxy Server may sometimes return a response even to a Subscribe message transmitted by the NAN device. This can increase the possibility for the NAN device searching a service to detect the service provided by the Proxy Client even when the Proxy Client has the DOZE state.

Next, configurations of the wireless communication system and the communicating device will be described.

Configuration of Wireless Communication System

First, an example of a configuration of a wireless communication system according to this embodiment will be described with reference to FIG. 1. The wireless communication system according to this embodiment includes NAN devices 101 to 104 each of which is a communicating device (NAN device) based on a NAN standard. The NAN devices 101 to 104 are participating in a NAN cluster 105. NAN devices (NAN devices 101 to 104) participating in the NAN cluster 105 establish a wireless network (cluster) with a frequency channel 6 (6 ch). Here, the NAN cluster 105 has a DW period 16 TU long, and a time interval from a starting time of the DW period to a starting time of the next DW period is equal to 512 TUs.

It is assumed that the DW period is repeated by handling 16 DW periods from DW0 to DW15 as one cycle. Here, each of the DW periods is referred to as DWn (where n is an integer from 0 to 15). DW15 is followed by DW0 again. A DW0 is a DW period starting from a time when the lower 23 bits are "0x0" of a TSF (Time Synchronization Function) that is a timer counter to be used by the NAN cluster for synchronization. In the NAN cluster 105, a DW period starts every 512 TU. In this case, the DWn starts after a lapse of 512×n [TU] from start of DW0.

All NAN devices participating in the NAN cluster 105 always have an Awake state for receiving a wireless signal during at least DW0 period and do not have a Doze state.

The NAN device 101 is a communicating device which can execute processes which will be described below. The NAN device 101 can detect a neighboring communicating device and a service provided by it based on a NAN standard and can notify information regarding the service available from the NAN device 101. The NAN device 101 can operate as a Proxy Server which can execute by proxy a search and a notification of a service of another NAN device. It is assumed here that the NAN device 101 participates as a Non-Master Non-Sync in the NAN cluster 105. The NAN device 101 has a first mode for receiving a wireless signal during DW0, DW4, DW8, and DW12 and a second mode for receiving a wireless signal during all DW periods.

The NAN device 102 is a communicating device participating as a Master in the NAN cluster 105. The NAN device 102 receives a wireless signal during all DW periods and transmits a Sync Beacon during all DW periods. The NAN device 103 is a communicating device participating in the NAN cluster 105 as a Non-Master non-Sync. The NAN device 103 transmits and receives a wireless signal only during DW0. It is assumed that the NAN device 103 is a Publisher (providing device) which provides a predetermined service searched by the NAN device 104. The NAN device 104 is a communicating device participating in the NAN cluster 105 as a Non-Master non-Sync. The NAN device 104 is a Subscriber (search device) which searches a predetermined service provided by the NAN device 103. The NAN devices 101 to 104 have a DOZE state without supplying power to their own communication units during a DW period in which they do not transmit and receive a wireless signal.

Configuration of NAN Device 101

Figure 2:
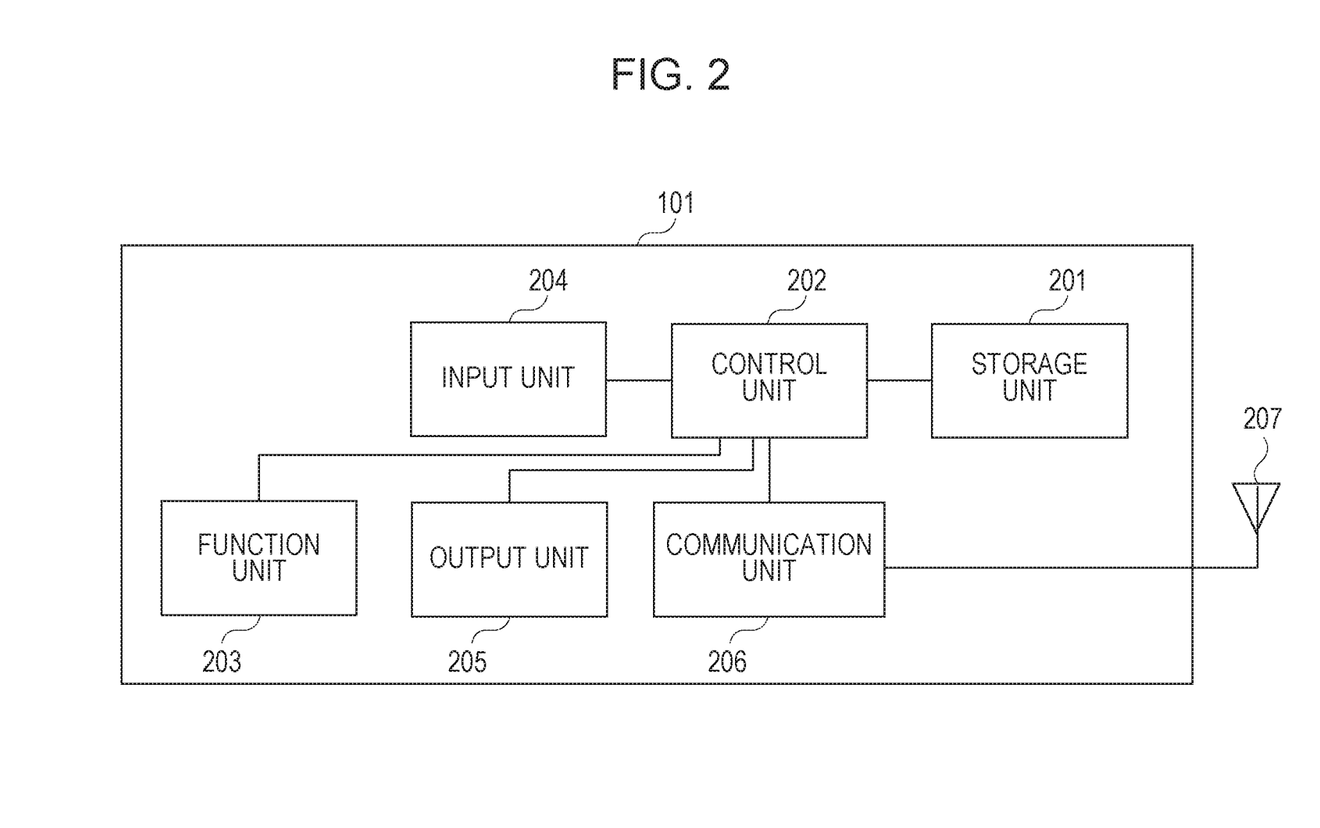
FIG. 2 is a block diagram illustrating a hardware configuration of an NAN device.

FIG. 2 illustrates a hardware configuration of the NAN device 101 according to this embodiment. The other NAN devices 102 to 104 also have the same hardware configuration. The NAN device 101 has a storage unit 201, a control unit 202, a function unit 203, an input unit 204, an output unit 205, a communication unit 206 and an antenna 207.

The storage unit 201 may include one or more memories which are a ROM and a RAM or either one of them and may store a program for executing an operation, which will be described below, and information such as a communication parameter for performing wireless communication. Here, the ROM stands for read only memory, and the RAM stands for random access Memory. The storage unit 201 may be a memory such as a ROM or a RAM or may be a storage medium such as a flexible disk, a hard disk, an optical disk, a magneto-optical disk, a CD-ROM, a CD-R, a magnetic tape, a nonvolatile memory card, or a DVD.

The control unit 202 includes one or more processors such as a CPU and an MPU and may execute a program stored in the storage unit 201 to control the NAN device 101 overall. Here, the CPU stands for central processing unit, and the MPU stands for a micro-processing unit. The control unit 202 may control the NAN device 101 overall in collaboration with a program stored in the storage unit 201 and an OS (Operating System).

The control unit 202 is configured to control the function unit 203 to execute predetermined processes such as image capturing, printing, and projection. The function unit 203 is hardware configured to execute those predetermined processes by the NAN device 101. For example, in a case where the NAN device 101 is a camera, the function unit 203 may be an imaging unit configured to perform image capturing processing. For example, in a case where the NAN device 101 is a printer, the function unit 203 is a printing unit configured to perform printing processing. For example, in a case where the NAN device 101 is a projector, the function unit 203 is a projecting unit configured to perform projection processing. Data to be processed by the function unit 203 may be stored in the storage unit 201 or may be communicated with another NAN device through the communication unit 206, which will be described below.

The input unit 204 is configured to receive an operation from a user. An output unit 205 is configured to output to a user. Here, the output unit 205 may output at least one of display on a display screen of a display unit, an audio output through a speaker, and vibrations. Both of the input unit 204 and the output unit 205 can be implemented as one module like a touch panel.

The communication unit 206 is configured to control wireless communication based on IEEE802.11 standard series, particularly, a wireless communication based on NAN and control IP communications. The communication unit 206 is configured to transmit and receive a wireless signal for wireless communication through the antenna 207. The NAN device 101 may use the communication unit 206 to communicate contents such as image data, document data, and video data with a NAN device.

Processing Flow

Figure 1:
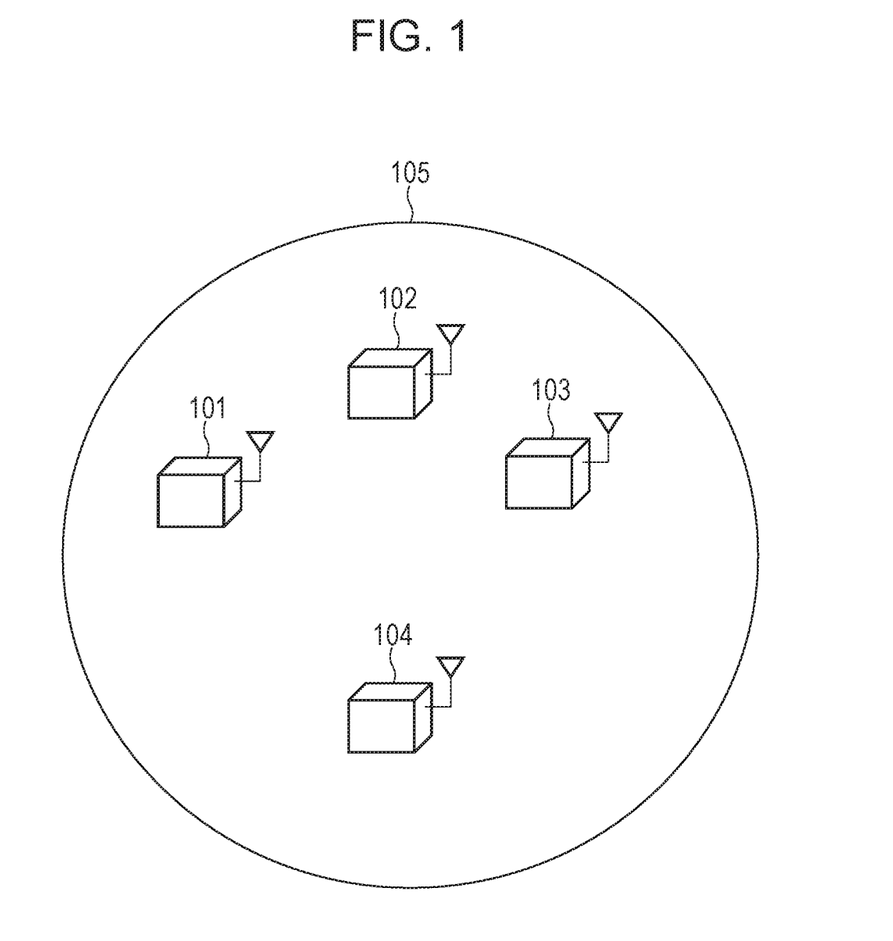
FIG. 1 illustrates a configuration example of a wireless communication system.

Next, a processing flow to be executed by the NAN device 101 as described above and sequences in the wireless communication system as illustrated in FIG. 1 will be described in detail.

Figure 3:
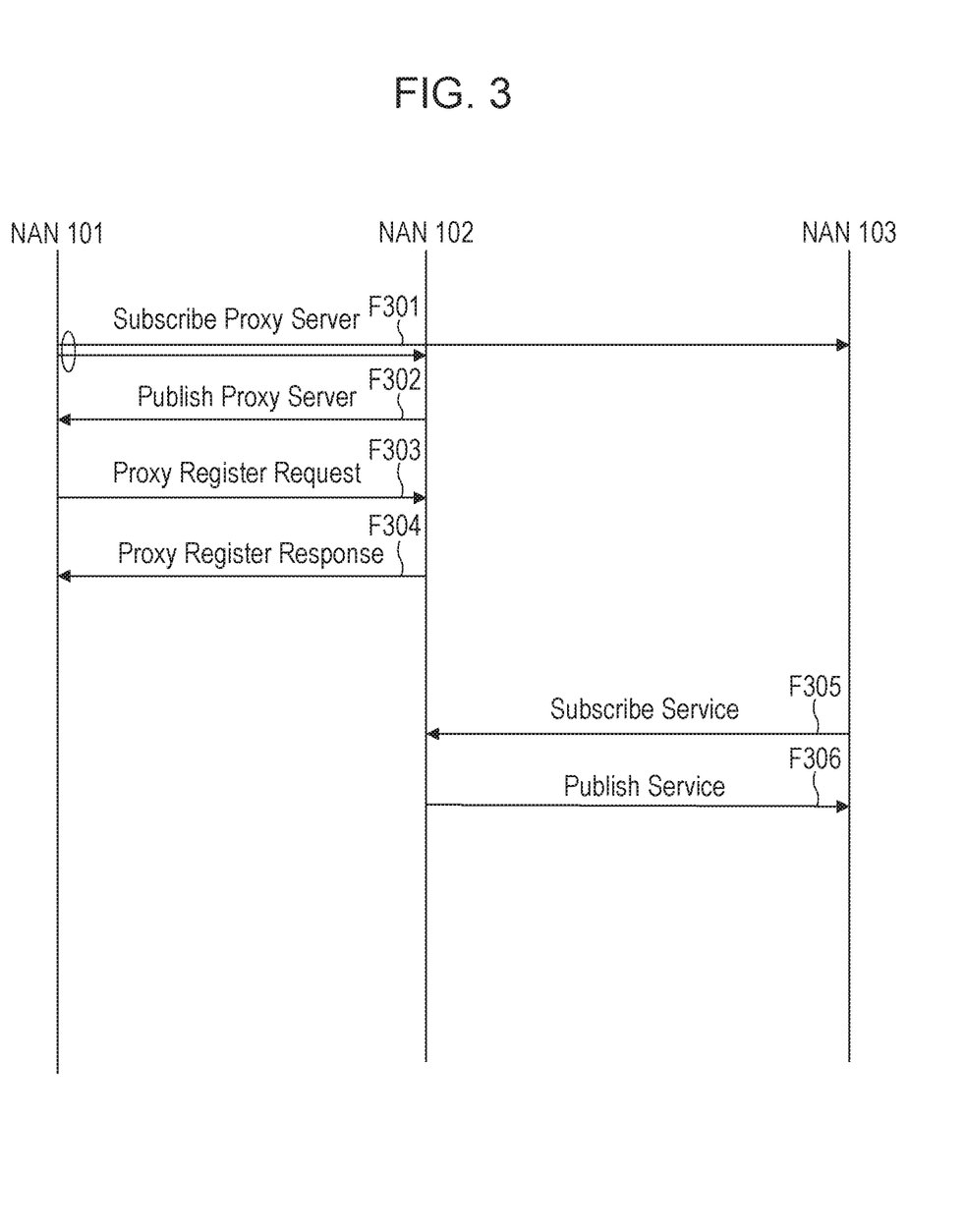
FIG. 3 is a sequence diagram illustrating a flow of Proxy request processing.

FIG. 3 is a sequence diagram to be performed in a case where the NAN device 101 operates as a Proxy Client and where the NAN device 102 operates as a Proxy Server. Next, a case will be described in which the NAN device 101 that operates as a Proxy Client searches the NAN device 102 that is a Proxy Server to request a proxy process. It is assumed here that the NAN device 101 operates in a second mode for receiving a wireless signal during all DW periods.

First, the NAN device 101 transmits a Subscribe message (hereinafter, Subscribe) for searching a Proxy Server (that is a device for executing a service of the Proxy Server) (F301). The Subscribe is transmitted during a DW period. However, embodiments of the present disclosure are not limited thereto, but a Subscribe may be transmitted at a time outside a DW period, which is notified in advance within the DW period.

The NAN device 101 transmits a Subscribe to a plurality of NAN devices belonging to one cluster by multicasting. Embodiments of the present disclosure are not limited thereto, but a Subscribe may be transmitted to a plurality of NAN devices belonging to one cluster by broadcasting. The NAN device 101 may repeat transmitting a Subscribe by unicasting to each of the devices. A Subscribe may be transmitted by broadcasting to a plurality of networks (including a NAN cluster different from the NAN cluster 105).

The NAN device 102 that is a Proxy Server having received the Subscribe transmits a Publish message (hereinafter a Publish) to the NAN device 101 that is a transmission source of the Subscribe (F302). Here, a Publish is transmitted within the DW period. Embodiments of the present disclosure are not limited thereto, but the Publish may be transmitted outside a DW period, which is notified in advance within the DW period.

The Publish is transmitted by unicasting to the NAN device 101. However, embodiments of the present disclosure are not limited thereto, but the Publish may be transmitted to a plurality of NAN devices belonging to one cluster by multicasting or broadcasting. The Publish may be transmitted by broadcasting to a plurality of networks (including a NAN cluster different from the NAN cluster 105). The Publish may be transmitted periodically independent of reception of a Subscribe by the NAN device 102. In this case, a system configuration without step F301 is also possible.

The NAN device 101 receives the Publish so that the NAN device 101 recognizes that the NAN device 102 executes a service of the Proxy Server. Accordingly, the NAN device 101 requests proxy transmission of service information to the NAN device 102. More specifically, a registration request message that requests proxy transmission of a service and that is a Proxy Register Request message (based on a NAN standard, called a Proxy Register Request hereinafter) is transmitted (F303).

The Proxy Register Request is transmitted during a period within a DW for power saving of the NAN device 101 which operates as a Proxy Client and the NAN device 102 which operates as a Proxy server. Embodiments of the present disclosure are not limited thereto, but a Proxy Register Request may be transmitted at a time outside a DW period, which is notified in advance within the DW period. Whether the transmission is performed within a DW period or outside the DW period may be switched based on the communication state within the DW period or the number of devices participating in the NAN cluster 105. With this configuration, a communicating device can request a proxy transmission of service information for power saving and at an appropriate time based on the network state.

If the NAN device 102 receives the Proxy Register Request from the NAN device 101, the NAN device 102 analyzes the content of the message and judges whether the proxy transmission requested by the NAN device 102 can be executed. If the proxy transmission can be executed, the NAN device 102 stores the request content within the NAN device 102. Then, a Proxy Register Response message (hereinafter Proxy Register Response) indicating that the requested proxy transmission can be executed is transmitted to the NAN device 101 (F304).

Next, a case will be described in which it is judged that the proxy transmission requested by the NAN device 102 cannot be executed as a result of the analysis of the Proxy Register Request from the NAN device 101. In this case, the NAN device 102 returns an error or a Proxy Register Response indicating that the requested proxy transmission cannot be executed to the NAN device 101. If it is judged that the requested proxy transmission cannot be executed, it means that the NAN device 102 has a process load (the amount of use by the processor or the memory) of a proxy process (such as proxy transmission or proxy search) is higher than a predetermined threshold value. Without limiting thereto, whether a proxy process can be executed or not can be judged based on a setting relating to the requesting device is permitted to perform the proxy process based on a user instruction, for example.

It may be configured such that the NAN device 102 does not respond if a requested proxy process cannot be executed. In this case, because receiving a Proxy Register Response indicates that the proxy process can be executed, information indicating that the proxy process can be executed may not be added to the Proxy Register Response.

The Proxy Register Response is transmitted during a DW period for power saving of the NAN device 101 which operates as a Proxy Client and of the NAN device 102 which operates as a Proxy Server. Without limiting thereto, the Proxy Register Response may be transmitted at a time outside a DW period, which is notified in advance within the DW period. Based on the communication state within the DW period or based on the number of devices participating in the NAN cluster 105, whether the Proxy Register Response is to be transmitted within the DW period or outside the DW period may be changed. This configuration enables a communicating device to respond to a request for proxy transmission of service information for power saving and at an appropriate time based on the network state.

If the NAN device 101 receives a Proxy Register Response indicating that the proxy transmission can be executed from the NAN device 102, the NAN device 101 notifies that the proxy transmission has started to a user through the output unit 205. If the NAN device 102 transmits the Proxy Register Response indicating that the proxy transmission can be executed, the NAN device 102 notifies that the proxy transmission has started to a user through the output unit of the NAN device 102.

The NAN devices 101 and 102 may notify that the proxy transmission has started to an application using the transmission or search of the service information. Thus, the application can perform a process in response to the start of the proxy transmission.

The NAN device 101 may change the operation mode from the second mode to a first mode for receiving a wireless signal during a partial DW period when the Proxy Register Response indicating that the proxy transmission can be executed is received. This can increase the frequency that the communication unit 206 in the NAN device 101 has a DOZE state, which can further reduce power consumption relating to communication based on a NAN standard. Therefore, the power consumption of the NAN device 101 can be reduced.

Without limiting thereto, the NAN device 101 may change the operation mode from the second mode to the first mode when the Proxy Register Request is transmitted.

In a case where the NAN device 101 transmits a Publish for notifying service information of the NAN device 101, the transmission of the Publish may be terminated if the Proxy Register Response indicating that the proxy transmission can be executed is received. Thus, because the amount of signal to be transmitted by the NAN device 101 can be reduced, the power consumption relating to communication based on a NAN standard can be reduced. Therefore, the power consumption of the NAN device 101 can be reduced.

In a state that the NAN device 102 starts proxy transmission of service information, the NAN device 103 transmits a Subscribe for performing a service search (F305). The NAN device 102 transmits a Publish to notify the service information requested from the NAN device 101 based on service details provided by the NAN device 102 (F306). Thus, even when the NAN device 101 does not transmit a Publish to the Subscribe, the NAN device 103 can learn the service executed by the NAN device 101.

Having described a proxy transmission of a service, the same sequence can be executed on a proxy search for a service. In this case, instead of F305 and F306, the NAN device 102 transmits a Subscribe and receives a Publish from another NAN device which provides a service. In a case where another NAN device which provides a service periodically transmits a Publish, the NAN device 102 may omit the transmission of a Subscribe. If the Publish is received, the NAN device 102 notifies the NAN device 101 of the service information included in the Publish at a proper time. The proper time may be within a DW period subsequent to a time when the Publish is received, for example. In this way, the NAN device 101 can obtain service information provided by another NAN device.

In a case where the NAN device 101 itself transmits a Subscribe, the transmission of the Subscribe may be terminated in response to a Proxy Register Response indicating that a proxy search is executable. This can reduce the amount of signal to be transmitted by the NAN device 101 so that power consumption relating to communication based on a NAN standard can be reduced. Therefore, the power consumption by the NAN device 101 can be reduced.

Figure 4:
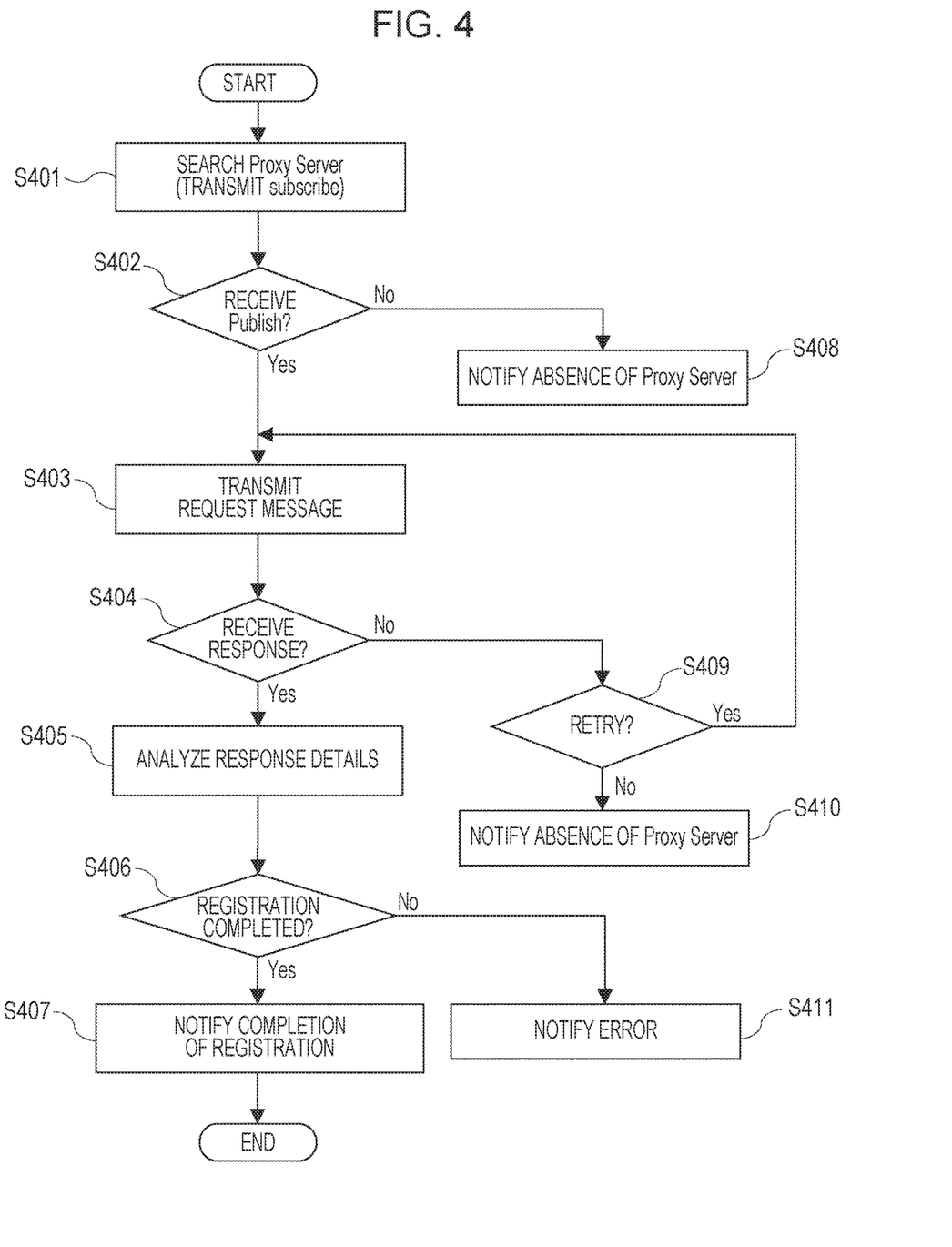
FIG. 4 is a flowchart to be executed by a Proxy Client.

FIG. 4 is a flowchart illustrating a case where the NAN device 101 functioning as a Proxy Client requests a Proxy Server to perform a proxy process for transmission or search of service information. The flowchart illustrated in FIG. 4 is started when a user turns on a NAN communication function. Without limiting thereto, it may be started in response to an instruction by a user to request a proxy process for transmission or search of service information. At a predetermined time or when the NAN device 101 belongs to a predetermined position or range or disassociates therefrom, or when the NAN device 101 belongs to a new cluster, the flowchart may start if a predetermined condition is satisfied. The predetermined time may include a time after a lapse of a predetermined period of time measured by a timer. Alternatively, the flowchart may start when the NAN device 101 is powered on.

Here, the flowchart illustrated in FIG. 4 can be implemented by a program stored in the storage unit 201 and read out by the control unit 202. All or some of steps of the flowchart in FIG. 4 may be implemented by hardware such as an ASIC.

First, the NAN device 101 starts searching a Proxy Server (S401). A Proxy Server may be searched by one of two types of methods.

According to a first type method, the NAN device 101 may transmit a Subscribe (that is a search signal for searching a device which can execute a proxy process service) and receives a Publish from the Proxy Server which has received the Subscribe so that active searching can be achieved. Here, the Publish to be transmitted from the Proxy Server includes information indicating that the proxy process service is executable.

According to a second method, the NAN device 101 may passively wait for a Publish periodically transmitted during DW periods from a Proxy Server, without transmitting a Subscribe. In either method, the NAN device 101 in S401 waits for a Publish from the Proxy Server. The Publish is waited only during DW periods, and the device is changed to have a Doze state outside the DW periods so that the device cannot wait for the Publish.

Next, in a case where the NAN device 101 does not receive the reception as a result of the wait for the Publish for a predetermined period of time (No in S402), an absence notification is given which indicates that there is not a Proxy Server which can execute the proxy process (S408), The absence notification is transmitted to a user through the output unit 205. Additionally or alternatively, the absence notification may be transmitted to an application which uses service information through NAN communication.

In a case where the Publish is received but if the Publish does indicate that no request for a new proxy process is to be received, the processing may move to step S408.

When the absence notification is transmitted, the processing may start again from step S401 in response to a user operation or if the predetermined condition is satisfied.

On the other hand, if the Publish is received (Yes in S402), it means that the NAN device 101 detects a Proxy Server. Here, the NAN device 102 is detected as the Proxy Server. In this case, the NAN device 101 transmits a Proxy Register Request to the NAN device 102 (S403), The Proxy Register Request includes information (instance) regarding the proxy process (proxy transmission or proxy search) for the service requested by the NAN device 101. The NAN device 101 may transmit the Proxy Register Request before the predetermined period of time passes.

After transmitting the Proxy Register Request, the NAN device 101 receives a response message from the NAN device 102 (S404). The response message corresponds to the Proxy Register Response.

In a case where a response message is not received for a predetermined period of time (that may be equal to or not equal to the predetermined period of time in S402), the NAN device 101 judges whether the Proxy Register Request is to be re-transmitted or not (S409). This may be determined based on whether the number of times of transmission of the Proxy Register Request exceeds a predetermined value, for example. Alternatively, it may be determined based on whether the number of times of judgment in step S404 or S409 exceeds a predetermined value. The predetermined value may depend on an application which is executed by the NAN device 101 or may be defined by a user.

If it is judged in step S409 that a re-trial is to be performed (Yes in S409), the processing returns to step S403 where the NAN device 101 re-transmits a Proxy Register Request. On the other hand, if it is judged that no re-trial is to be performed, the absence notification is transmitted, like step S408 (S410). Instead of the absence notification, an error notification may be transmitted which indicates the request for a proxy process has failed to the Proxy Server which can execute the proxy process.

Next, a case where the response message (Proxy Register Response) is received in step S404 (Yes in S404) will be described. In this case, the NAN device 101 analyzes a content of the received Proxy Register Response (S405). More specifically, whether the received Proxy Register Response indicates that the proxy process requested in step S403 is executable or not is analyzed.

If the analysis results in that the requested proxy process is executable (Yes in S406), the NAN device 101 notifies a user through the output unit 205 of that the proxy process has started (S407). In this case, information regarding the NAN device 102 which performs the proxy process may additionally be notified to the user. The NAN device 101 may transmit the service information or notify an application which uses the search of that the proxy process has started (which is called an instance registration completion notification).

On the other hand, if the analysis results in that the requested proxy process is not executable (No in S406), the NAN device 101 notifies an error to a user (S411). More specifically, an error indicating that the request for the proxy process has failed is notified to the Proxy Server which can execute the proxy process. Additional information if any may be notified along with the Proxy Register Response. The additional information may describe a reason why the proxy process is not executable, for example.

Figure 5:
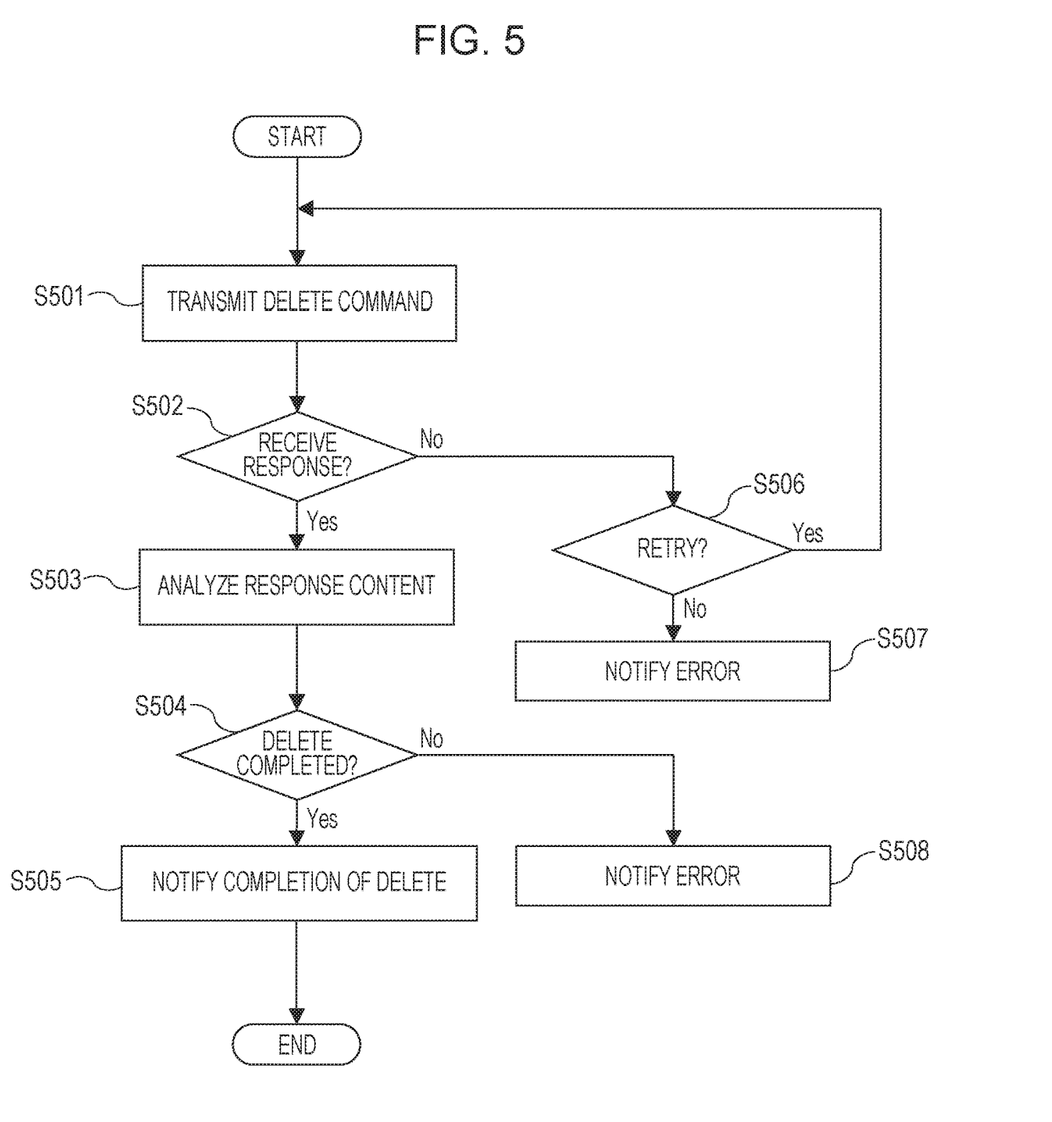
FIG. 5 is a flowchart to be executed by a Proxy Client.

FIG. 5 is a flowchart for requesting termination of a proxy process by a Proxy Server requested by the NAN device 101. The flowchart illustrated in FIG. 5 is started if service information provided by the NAN device 101 is changed in a case where a Proxy Server is requested to perform proxy transmission. Alternatively, the flowchart is started if service information to be searched is changed in response to the shift to an ON/OFF state of the application executed by the NAN device 101, for example, in a case where a proxy search is requested to a Proxy Server. In this case, termination (or deletion of registered instance) of the proxy process requested to the Proxy Server may be necessary.

Without limiting thereto, the flowchart may start when a user or an application instructs to terminate the proxy process. At a predetermined time or when the NAN device 101 belongs to a predetermined position or range or disassociates therefrom, or when the NAN device 101 belongs to a new cluster, the flowchart may start if a predetermined condition is satisfied. The predetermined time may include a time after a lapse of a predetermined period of time measured by a timer.

Here, the flowchart illustrated in FIG. 5 can be implemented by a program stored in the storage unit 201 and read out by the control unit 202. All or some of steps of the flowchart in FIG. 5 may be implemented by hardware such as an ASIC.

First, the NAN device 101 transmits to a Proxy Server a termination request message requesting termination of a requested proxy process, which is a Proxy Deregister Request message based on a NAN standard (S501). Hereinafter, the Proxy Deregister Request message will simply be called a Proxy Deregister Request. The Proxy Server is the NAN device 102, for example, in the following description.

The Proxy Deregister Request may include information regarding a service for requesting termination of a proxy process. In a case where the message does not include information regarding a service requesting termination of a proxy process, the Proxy. Server may terminate the proxy process relating to all services requested by the NAN device 101. If the message only designates a proxy transmission or a proxy search without designating a service, the proxy process relating to all services associated with the designated proxy process may be terminated.

Instead of the Proxy Deregister Request, a Proxy Register Request may be used. In this case, the Proxy Server may only perform a proxy process designated in the Proxy Register Request and may terminate other proxy processes.

After the message is transmitted, the NAN device 101 waits for a response message from the NAN device 102 (S502). It should be noted that the response message is a Proxy Deregister Response message (hereinafter a Proxy Deregister Response) based on a NAN standard. Instead of this, however, a Proxy Register Response may be used.

If no response message is received within a predetermined period of time (may be equal to or not equal to the predetermined period of time in S402 or S409), the NAN device 101 judges whether the Proxy Deregister Request is to be re-transmitted or not (S506). This may be determined based on whether the number of times of transmission of the Proxy Deregister Request exceeds a predetermined value or not, for example. Instead of this, it may be determined based on whether the number of times of judgment in step S506 exceeds a predetermined value. The predetermined value may depend on an application which is executed by the NAN device 101 or may be defined by a user.

If it is judged in step S506 that a re-trial is to be performed (Yes in S506), the processing returns to step S501 where the NAN device 101 re-transmits a Proxy Deregister Request to the NAN device 102.

On the other hand, if it is judged that no re-trial is to be performed (No in S506), the NAN device 101 notifies an error to a user (S507). The error notification may be a notification indicating that the termination of the proxy process has failed or may be an absence notification indicating that the NAN device 102 which is executing the proxy process cannot be found.

The Proxy Deregister Request and the Proxy Deregister Response are transmitted within a DW period. However, without limiting thereto, a Proxy Deregister Request and a Proxy Deregister Response may be transmitted at a time outside a DW period, which is notified in advance within the DW period.

Next, a case will be described in which a response message is received in step S502 (Yes in S502) will be described. If a response message is received from the NAN device 102, the NAN device 101 analyzes a content of the received response message (S503). The NAN device 101 then judges whether the termination of the proxy process requested in step S501 has been normally accepted (S504). It is assumed here that the response message includes information regarding whether it has been normally accepted or not. However, instead of this, only if the termination of the proxy process requested in step S501 has been normally accepted and when the response message is to be transmitted, the processing in step S503 can be omitted. The case where the termination of the proxy process requested in step S501 has not been normally accepted may correspond to a case where some error may occur in the NAN device 102 so that a normal response cannot be returned.

If it is analyzed that the termination of the requested proxy process has been normally received (Yes in S504), the NAN device 101 notifies a user through the output unit 205 of that the proxy process has been terminated (S505). In this case, the information regarding the NAN device 102 which has terminated the proxy process may also be notified to the user. The NAN device 101 may also notify that the proxy transmission has been terminated (which will be called an instance deletion completion notification) to an application which uses transmission or search of the service information.

On the other hand, if it is analyzed that the termination of the requested proxy process has not been normally received (No in S504), the NAN device 101 notifies an error to a user (S508). More specifically, the NAN device 101 notifies an error indicating that the request for termination of the proxy process has failed to the Proxy Server. Here, additional information if any may be notified along with the response message. The additional information may include a reason why the termination of the proxy process has been normally accepted.

Figure 6:
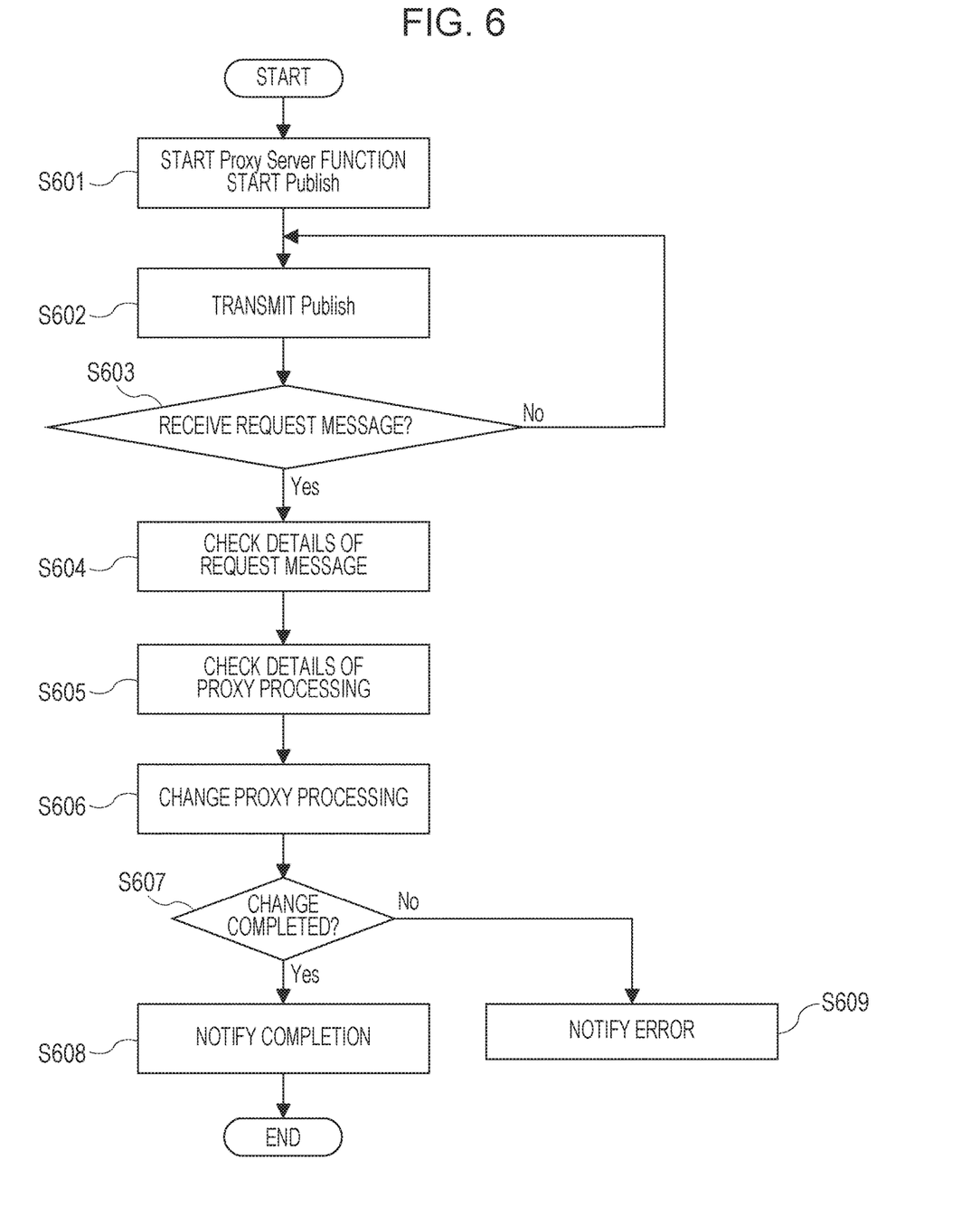
FIG. 6 is a flowchart to be executed by a Proxy Server.

In steps S607 and s 608 in the flowchart, the processing (such as transmission of a Publish or a Subscribe) corresponding to the proxy process requested by the NAN device 101 may start. Particularly, in a case where the NAN device 101 requesting the proxy process performs the process (such as transmission of a Publish or a Subscribe) corresponding to the proxy process before requesting and terminates the process in response to start of the proxy process, these process are re-started. Thus, if the Proxy Server cannot execute a proxy process properly, the NAN device 101 itself may perform the process so that the application can notify or search the service properly. This can improve user convenience therefore.

Next, FIG. 6 illustrates a flowchart in a case where the NAN device 102 is a Proxy Server to receive a request relating to a proxy process from a Proxy Client.

The flowchart illustrated in FIG. 6 is started if a user turns on a NAN communication function. However, without limiting thereto, the flowchart may start if a user instructs to start a proxy process. At a predetermined time or when the NAN device 102 belongs to a predetermined position or range or disassociates therefrom, or when the NAN device 102 belongs to a new cluster, the flowchart may start if a predetermined condition is satisfied. The predetermined time may include a time after a lapse of a predetermined period of time measured by a timer. Alternatively, the flowchart may start when the NAN device 102 is powered on. The flowchart may start when the power supply to the NAN device 102 is changed from a battery to a commercial power supply.

Here, the flowchart illustrated in FIG. 6 can be implemented by a program stored in alternatively storage device and read out by the NAN device 102. All or some of steps of the flowchart in FIG. 6 may be implemented by hardware such as an ASIC.

First, the NAN device 102 starts functioning as a Proxy Server (S601). The NAN device 102 then transmits a Publish including information indicating that a Proxy Server service is provided along with service information such as a printing service and an image capturing service provided by the NAN device 102 (S602).

The Publish may be transmitted to other NAN devices within the NAN cluster 105 in which the NAN device 102 is participating by broadcasting, multicasting, or unicasting. The Publish may be transmitted to a plurality of clusters including another cluster different from the NAN cluster 105. The Publish is transmitted within a DW period of the cluster in which the NAN device 102 is participating. However, without limiting thereto, the Publish may be transmitted at a time outside a DW period, which is notified in advance within the DW period.

The NAN device 102 may periodically transmit a Publish or may transmit a Publish in response to reception of a Subscribe from another. Alternatively, one or both of the methods may be applied.

In a case where the NAN device 102 provides a proxy process function but temporarily cannot receive a new proxy process, additional information indicating that a new proxy process is not acceptable may be added to the Publish. Because a new request is accepted in this case, the processing after step S603 is not performed. The NAN device 102 repeats the processing in step S602 until a new proxy process is acceptable. Alternatively, an error may be notified to a user, and the flow illustrated in FIG. 6 may end.

Next, the NAN device 102 waits for a request message relating to a proxy process from a Proxy Client (NAN device 101 here) (S603). Here, the request message relating to a proxy process may be a Proxy Register Request or a Proxy Deregister Request. The NAN device 102 continues the processing in step S602 until a request message is received (No in S603).

If a request message is received (Yes in S603), the NAN device 102 checks a content of the received request message (S604). More specifically, whether the received request message is a Proxy Register Request or a Proxy Deregister Request is checked. Also, whether it corresponds to a proxy transmission, a proxy search or any other service is checked.

The NAN device 102 checks type of the executed proxy process (S605) and, based on the type of the request message, changes the type of the proxy process as required. (S606). A case will be described where a proxy transmission of a printing service is requested from the NAN device 101, for example. The NAN device 102 checks whether the proxy transmission of the printing service of the NAN device 101 has already been executed or not and, if not, newly starts a proxy transmission of the printing service of the NAN device 101. On the other hand, if the proxy transmission of the printing service of the NAN device 101 has already been executed, the type of the proxy process is not particularly changed.

Another example will be described in which the NAN device 101 requests termination of a proxy transmission of a printing service. The NAN device 102 checks whether a proxy transmission of the printing service of the NAN device 101 is being executed or not and, if so, the proxy transmission of the printing service of the NAN device 101 is terminated. On the other hand, if the proxy transmission of the printing service of the NAN device 101 has already been executed, the type of the proxy process is not particularly changed.

The NAN device 102 then judges whether changes of the types of the proxy process as required have all completed normally (S607). If all processes have completed normally (Yes in S607), the NAN device 102 transmits a response message including information indicating that the request has received normally to the NAN device 101 (S608). The NAN device 102 notifies these results to a user (S608).

On the other hand, if the type of the proxy process changed as required has not completed normally, the NAN device 102 transmits a response message including information that the request has not been received normally to the NAN device 101 (S609). The NAN device 102 notifies these results to a user (S609).

Referring to FIG. 6, the example has been described in which the NAN device 102 starts functioning as a Proxy Server and receives a message requesting a proxy process. However, without limiting thereto, the NAN device 102 may not start functioning as a Proxy Server but may add information indicating that a Proxy Server is executable to a Publish to notify to a Proxy Client. Thus, even before the NAN device 102 starts functioning as a Proxy Server, a request for starting a proxy process can be received. In response to reception of a request for starting a proxy process, the NAN device 102 can start functioning as a Proxy Server.

The deletion of an instance may be executed irrespective of the presence or absence of the function as a Proxy Server.

According to this embodiment as described above, information regarding a proxy process of a NAN can be provided to a user. Because information is provided when a proxy process is requested, information regarding the proxy process of the NAN can be provided to a user at a proper time. Therefore, a user can recognize future reduction of consumption of a battery per unit time of a device, for example.

Information regarding a proxy process of a NAN is notified to an application which provides an image capturing function or a printing service function. Thus, because the application can grasp the information regarding the proxy process of the NAN, the application can perform a control in view of the state of the proxy process.

The Proxy Server requested to perform a Proxy Client proxy process can reduce the frequency for obtaining the DOZE state (including a case where a proxy process is to be executed in response to the request). For example, before a proxy process is requested, a wireless signal is received during a DW0, a DW4, a DW8, and DW12, and the DOZE state is obtained in the other DW periods such that a wireless signal can be received during all DW periods after the proxy process is requested. Thus, in a case where a Proxy Server does not perform a proxy process, power can be saved, and a period for a proxy process can appropriately be acquired.

The present disclosure may be implemented by software program code which implements the aforementioned functions supplied in a storage medium to a system or a device and read out by a computer (CPU, MPU) in the system or device. In this case, program code itself read out from a storage medium implements the aforementioned functions of the embodiments, and a storage medium storing the program code is included in the present disclosure.

The storage medium for supplying the program code may be a flexible disk, a hard disk, an optical disk, a magneto-optical disk, a CD-ROM, a CD-R, a magnetic tape, a nonvolatile memory card, a ROM, or a DVD, for example.

The program code read out by a computer may not only be executed not only to implement the functions, but also an OS running on the computer may perform a part or all of actual processes based on instructions of the program code to implement the functions. The term "OS" stands for operating system.

The program code read out from the storage medium may be written in a memory included in a functional extension board to be inserted into the computer or a memory included in a functional extension unit connected to the computer. Based on the instructions of the program code, a CPU included in the functional extension board or the functional extension unit may perform a part or all of actual processes to implement the functions.

According to the aforementioned embodiments, in a case where a request relating to a proxy process is transmitted or is received according to a scheme based on a NAN standard, a user can be notified information regarding the proxy process.

Other Embodiments

Embodiment(s) of the present invention can also be realized by a computer of a system apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-176377 filed Sep. 14, 2017 which is hereby incorporated by reference herein in its entirety.

What is claimed is:

1. A communicating device comprising:
one or more processors; and
one or more memories including instructions that, when executed by the processor(s), cause the device to:
send, to a proxy device, a request that causes the proxy device to start a notification of service information provided by the communicating device according to a scheme compliant with NAN (Neighbor Awareness Networking) standard;
obtain, from the proxy device, execution information indicating whether the proxy device accepts the request or not in response to the request; and
perform notification based on the obtained execution information to a user,
wherein in a case where the proxy device accepts the request, the communicating device controls such that power consumption relating to communication compliant with NAN standard by the communicating device is lower than that before the request is sent.

2. The communicating device according to claim 1,
wherein the communicating device notifies the service information according to the scheme compliant with NAN standard.

3. The communicating device according to claim 1,
wherein, in a case where the communicating device sends the request to start a notification of the service information, the communicating device terminates the notification of the service information.

4. The communicating device according to claim 1,
wherein the communicating device notifies the service information by using a Publish compliant with NAN standard.

5. The communicating device according to claim 1,
wherein the request is a Proxy Register Request compliant with NAN standard.

6. The communicating device according to claim 1,
wherein the communicating device is a Proxy Client compliant with NAN standard; and
wherein the proxy device is a Proxy Server compliant with NAN standard.

7. The communicating device according to claim 1,
wherein the communicating device performs the notification to a user by using a display unit.

8. The communicating device according to claim 1,
wherein in a case where the proxy device accepts the request, the communicating device controls such that a frequency that a communication unit in the communicating device has a DOZE state is higher than before the request is sent so that the power consumption relating to communication compliant with NAN standard by the communicating device is lower than that before the request is sent.

9. A communicating device comprising:
one or more processors; and
one or more memories including instructions that, when executed by the processor(s), cause the device to:
send, to a proxy device, a request that causes the proxy device to start a search of service information provided by another communicating device according to a scheme compliant with NAN (Neighbor Awareness Networking) standard;
obtain, from the proxy device, execution information indicating whether the proxy device accepts the request or not in response to the request; and
perform notification based on the obtained execution information to a user,
wherein in a case where the proxy device accepts the request, the communicating device controls such that power consumption relating to communication compliant with NAN standard by the communicating device is lower than that before the request is sent.

10. The communicating device according to claim 9,
wherein the communicating device searches the service information according to the scheme compliant with NAN standard.

11. The communicating device according to claim 9,
wherein, in a case where the communicating device sends the request to start a search of the service information, the communicating device terminates the search of the service information.

12. The communicating device according to claim 9,
wherein the communicating device searches the service information by using a Subscribe compliant with NAN standard.

13. The communicating device according to claim 9,
wherein the request is a Proxy Register Request compliant with NAN standard.

14. The communicating device according to claim 9,
wherein the communicating device is a Proxy Client compliant with NAN standard; and
wherein the proxy device is a Proxy Server compliant with NAN standard.

15. The communicating device according to claim 9,
wherein the communicating device performs the notification to a user by using a display unit.

16. The communicating device according to claim 9,
wherein in a case where the proxy device accepts the request, the communicating device controls such that a frequency that a communication unit in the communicating device has a DOZE state is higher than before the request is sent so that power consumption relating to communication compliant with NAN standard by the communicating device is lower than that before the request is sent.

17. A control method for a communicating device, the method comprising:
sending, to a proxy device, a request causes the proxy device to start a notification of service information provided by the communicating device according to a scheme compliant with NAN (Neighbor Awareness Networking) standard;

obtaining, from the proxy device, execution information indicating whether the proxy device accepts the request or not in response to the request; and performing notification based on the obtained execution information to a user, wherein in a case where the proxy device accepts the request, the communicating device controls such that power consumption relating to communication compliant with NAN standard by the communicating device is lower than that before the request is sent.

18. A control method for a communicating device, the method comprising:

sending, to a proxy device, a request that causes the proxy device to start a search of service information provided by another communicating device according to a scheme compliant with NAN (Neighbor Awareness Networking) standard;

obtaining, from the proxy device, execution information indicating whether the proxy device accepts the request or not in response to the request; and performing notification based on the obtained execution information to a user, wherein in a case where the proxy device accepts the request, the communicating device controls such that power consumption relating to communication compliant with NAN standard by the communicating device is lower than that before the request is sent.

19. A non-transitory computer-readable storage medium storing a computer program for causing a computer to execute a control method for a communicating device, the method comprising:

sending, to a proxy device, a request that causes the proxy device to start a notification of service information provided by the communicating device according to a scheme compliant with NAN (Neighbor Awareness Networking) standard;

obtaining, from the proxy device, execution information indicating whether the proxy device accepts the request or not in response to the request; and performing notification based on the obtained execution information to a user, wherein in a case where the proxy device accepts the request, the communicating device controls such that power consumption relating to communication compliant with NAN standard by the communicating device is lower than that before the request is sent.

20. A non-transitory computer-readable storage medium storing a computer program for causing a computer to execute a control method for a communicating device, the method comprising:

sending, to a proxy device, a request that causes the proxy device to start a search of service information provided by another communicating device according to a scheme compliant with NAN (Neighbor Awareness Networking) standard;

obtaining, from the proxy device, execution information indicating whether the proxy device accepts the request or not in response to the request; and performing notification based on the obtained execution information to a user, wherein in a case where the proxy device accepts the request, the communicating device controls such that power consumption relating to communication compliant with NAN standard by the communicating device is lower than that before the request is sent.

* * * * *